United States Patent
Nation

(10) Patent No.: US 8,069,899 B2
(45) Date of Patent: Dec. 6, 2011

(54) VERTICALLY ATTACHED GOLF CART CANOPY

(75) Inventor: Roger F. Nation, Brandon, FL (US)

(73) Assignee: Annwill, Inc., Tampa, FL (US)

( * ) Notice: Subject to any disclaimer, the term of this patent is extended or adjusted under 35 U.S.C. 154(b) by 312 days.

(21) Appl. No.: 11/485,213

(22) Filed: Jul. 12, 2006

(65) Prior Publication Data
US 2006/0249259 A1 Nov. 9, 2006

Related U.S. Application Data

(63) Continuation-in-part of application No. 10/774,975, filed on Feb. 9, 2004, now Pat. No. 7,100,662.

(51) Int. Cl.
*E04F 10/02* (2006.01)
(52) U.S. Cl. .............. 160/56; 135/88.01; 296/100.14
(58) Field of Classification Search .......... 160/45, 160/56, 57, 77, 351; 296/100.14; 135/88.01, 135/88.05
See application file for complete search history.

(56) References Cited

U.S. PATENT DOCUMENTS

| | | | |
|---|---|---|---|
| 208,564 A | 10/1878 | Bowers | |
| 2,689,579 A | 9/1954 | Sartori | |
| 4,830,037 A | 5/1989 | Held | |
| 5,069,481 A | 12/1991 | Strange | |
| 5,688,018 A | 11/1997 | Simpson | |
| 6,007,134 A | 12/1999 | Weston | |
| 6,076,206 A | 6/2000 | Celaya | |
| 6,216,714 B1 | 4/2001 | Tucker | |
| 6,220,647 B1 | 4/2001 | Winkler | |
| 6,227,217 B1 | 5/2001 | Peta | |
| 6,227,603 B1 | 5/2001 | Brock | |
| 6,416,109 B1 | 7/2002 | Tyrer et al. | |
| 6,481,780 B2 | 11/2002 | Dolan et al. | |
| 6,547,312 B2 | 4/2003 | Winkler | |
| 6,601,904 B2 | 8/2003 | Winkler | |
| 6,663,161 B1 | 12/2003 | Tyrer | |
| 6,663,162 B1 | 12/2003 | Tyrer | |

*Primary Examiner* — Blair M. Johnson
(74) *Attorney, Agent, or Firm* — The Livingston Firm; Edward M. Livingston, Esq.; Bryan L. Loeffler, Esq.

(57) ABSTRACT

A vertically attachable golf cart canopy having a folding canopy which allows other accessories, such as coolers and sand bottles, to be mounted underneath. The golf cart canopy has three components: a securing frame (1), canopy support bars (2) and (3) and a canopy (4), (5) and (16). The securing frame (1) is shaped so as to have two vertical legs (21) and a horizontal top bar (23). Frame structure tabs (8) are located at the base of the legs (21) wherein the support bars (2) and (3) are pivotally attached to the securing frame (1). Each leg (21) has a leg extension (24) with at least one securing tab (6) to secure the securing frame (1) to the golf bag support bar (18). The horizontal top bar (23) has a canopy holder (11) which holds the removably attached canopy (4), (5) and (16), a canopy flap (13) and a canopy fastener (15) in order for the user to keep the vertically attachable golf cart canopy in an upright position.

20 Claims, 4 Drawing Sheets

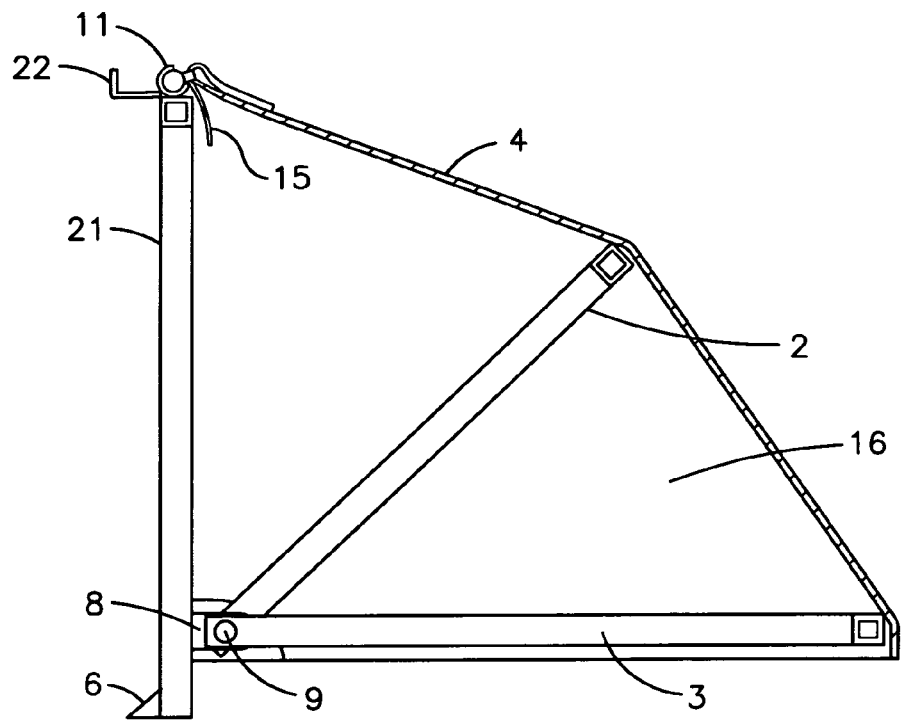
FIG. 6
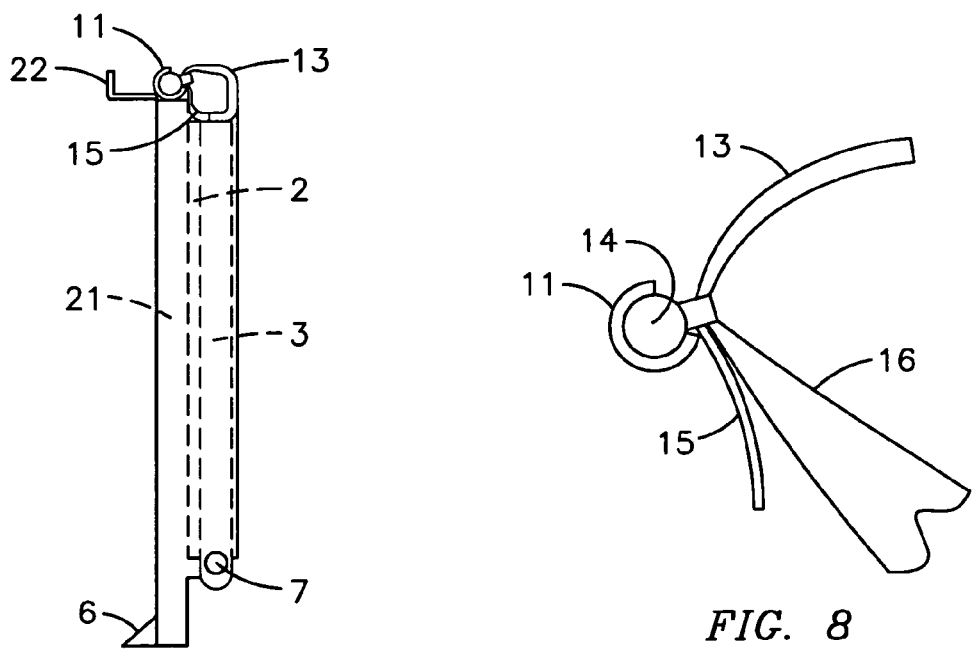
FIG. 7
FIG. 8

VERTICALLY ATTACHED GOLF CART CANOPY

CROSS REFERENCE TO RELATED APPLICATION

This is a continuation-in-part application of Ser. No. 10/774,975 filed on Feb. 9, 2004 now U.S. Pat. No. 7,100,662.

BACKGROUND OF THE INVENTION

This invention relates to golf cart canopies, more specifically, a vertically attached golf cart canopy having a folding canopy which allows other accessories, such as coolers and sand bottles, to be mounted underneath the device.

The use of golf carts has become commonplace in the game of golf. Golf carts have not only permitted golfers to get to the next hole quicker, but have also allowed golfers to bring along more items to the course to make the game more enjoyable, such as more clubs, tees, golfballs, beverages, sand bottles and the like. The golfers simply place the items in the back of the golf cart and drive the cart from hole to hole, enjoying the game of golf.

However, a perfect golfing day can quickly change into an imperfect day when inclement weather occurs. Although most golf carts have roofs which provide some shelter from rain for the players, all of the items in the back of the golf car are susceptible to being rained upon. The rain could not only damage the items in the back of the cart, but it could also ruin them altogether as well. This is especially unfortunate when the items ruined includes expensive golf clubs.

However, in order to protect these items, vertically attachable golf cart canopies have been created. Currently, there many vertically attachable golf cart canopies in use. However, major disadvantages to using the current canopies is that they either must be attached to the golf cart roof, are difficult to use or impede the amount of storage space beneath the cover. In addition, many of the currently used canopies require some sort of modification or alteration to the golf cart in order to secure the cover device to it. Not only is this difficult, but it could also affect the aesthetic appearance of the golf cart.

Thus, the need for a vertically attachable golf cart canopy which has an easy to use folding canopy which allows other accessories to be mounted underneath the cover and does not require modification to the golf cart is needed.

The relevant prior art includes the following patents:

| Pat. No. (U.S. unless stated otherwise) | Inventor | Issue Date |
|---|---|---|
| 6,663,161 | Tyrer | Dec. 16, 2003 |
| 6,663,162 | Tyrer | Dec. 16, 2003 |
| 6,416,109 | Tyrer et al. | Jul. 09, 2002 |
| 6,601,904 | Winkler | Aug. 05, 2003 |
| 6,547,312 | Winkler | Apr. 15, 2003 |
| 6,481,780 | Dolan et al. | Nov. 19, 2002 |
| 6,227,217 | Peta | May 08, 2001 |
| 4,830,037 | Held | May 16, 1989 |
| 6,220,647 | Winkler | Apr. 24, 2001 |
| 208,564 | Bowers | Oct. 01, 1878 |
| 5,069,481 | Strange | Dec. 03, 1991 |
| 6,227,603 | Brock | May 08, 2001 |
| 6,076,206 | Celaya | Jun. 20, 2000 |
| 5,688,018 | Simpson | Nov. 18, 1997 |
| 6,216,714 | Tucker | Apr. 17, 2001 |
| 2,689,579 | Sartori | Sep. 21, 1954 |
| 6,007,134 | Weston | Dec. 28, 1999 |

Although the above patents teach various types of vertically attachable golf cart canopies, none teach a vertically attachable golf cart canopy designed to have a folding canopy which allows other accessories, such as coolers and sand bottles, to be mounted underneath the cover.

SUMMARY OF THE INVENTION

The primary object of the present invention is to provide a vertically attached golf cart canopy that has a folding canopy.

A further object of the present invention is to provide a vertically attached golf cart canopy that allows other accessories, such as coolers and sand bottles, to be mounted underneath the cover.

An even further object of the present invention is to provide a vertically attached golf cart canopy that is easy to use.

A further object of the present invention is to provide a vertically attached golf cart canopy that is durable.

An even further object of the present invention is to provide a vertically attached golf cart canopy that is easy to attach to a golf cart.

A further object of the present invention is to provide a vertically attached golf cart canopy that can be attached to a golf cart without altering or modifying the golf cart.

The present invention fulfills the above and other objects by providing a vertically attached golf cart canopy having three components: a securing frame, canopy support bars and a canopy. The securing frame is shaped so as to have two vertical legs and a horizontal top bar. Securing tabs are located on the securing frame so as to secure the vertically attached golf cart canopy to a golf cart bag holder. Tabs are located at a predetermined location on the legs wherein the support bars are pivotally attached to the securing frame. The securing frame and canopy support bars are made of a rigid and durable material, preferably steel, so as to withstand rain and other outdoor elements, such as wind and hail, without affecting the structure of the securing frame and bars. The top of the securing frame has a canopy holder which holds the canopy to the securing frame. The canopy, preferably made of a waterproof material, is attached to the canopy support bars and is removably attached to the legs of the securing frame by using fastening means, preferably hook and loop type fastening material. The canopy holder also contains a canopy flap and a canopy fastener to allow the user to keep the vertically attachable golf cart canopy in an upright position.

To use the present invention, the user first takes the securing frame and positions the securing tabs on the golf bag support bar so the legs of the securing frame are located beneath the roof of a golf cart. The user then inserts a long bolt into the holes located on the securing tabs and uses threaded nuts and bolts to secure the securing frame onto the golf bag support bar. The user then takes the sides of the canopy and fastens each side to the securing frame by using a fastening means, such as hook and loop type fastening material. When the user desires the canopy to be down, he or she simply grabs the bottom canopy support bar and pulls downward. To raise the canopy, the user simply pushes the bottom canopy support bar upwards. In addition, the user can keep the canopy in an upright position by using the canopy flap and canopy fasteners. The flap has a fastening means, preferably snaps, while the canopy fasteners have the corresponding fastening means. While the canopy support bars are in the upright position, the user positions the canopy flap so it is extending away from the securing frame. The user then takes the canopy fasteners and matches the fastening means on the fasteners to the fastening means on the flap.

Because the frame is constructed so as to freely stand parallel to the cart support bar, no modifications to the golf cart are necessary for the installation of the present invention. However, an optional bracket located on the securing frame may also be used to maintain the vertically attached golf cart canopy in an upright position.

In addition, because the pivoting point of the canopy support bars are located at a distance above attachment area, more room is available in the golf cart storage area for other items, such as coolers and/or sand bottles, to be mounted.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which:

FIG. 6 is a cut-away view along the lines 6-6 of the embodiment of FIG. 1;

FIG. 7 is a side view of the present invention when compressed;

FIG. 8 is a side view of the canopy holder of the present invention;

DESCRIPTION OF THE PREFERRED EMBODIMENTS

Figure 1:
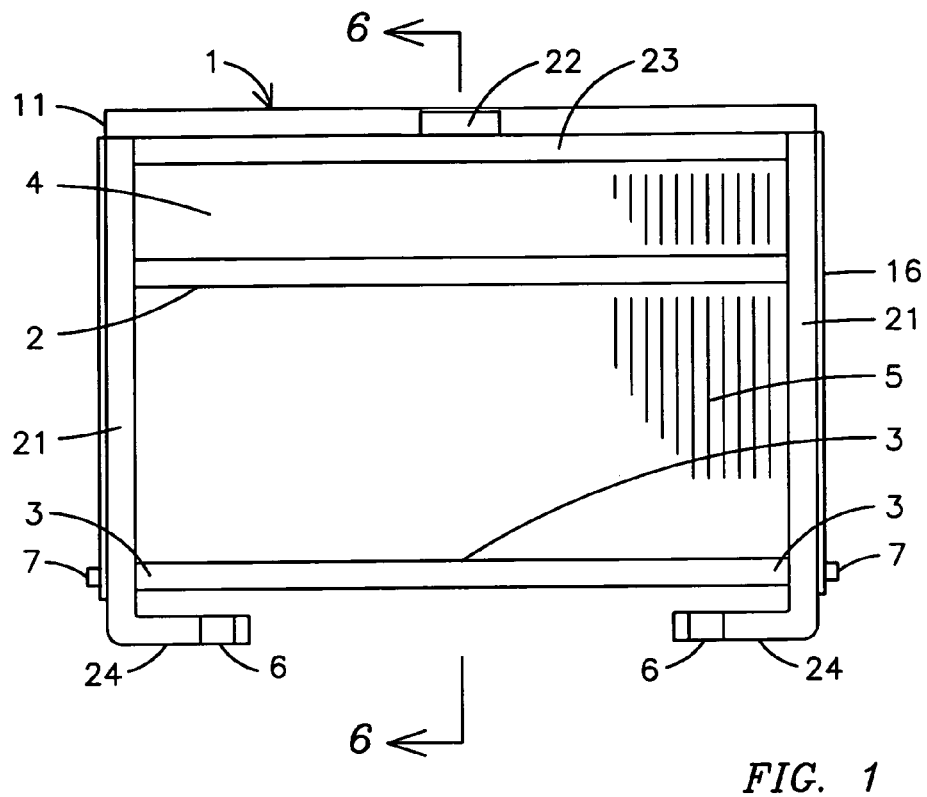
FIG. 1 is a frontal view of the vertically attachable golf cart canopy of the present invention.

For purposes of describing the preferred embodiment, the terminology used in reference to the numbered components in the drawings is as follows:

| | |
|---|---|
| 1. | securing frame |
| 2. | middle canopy support bar |
| 3. | bottom canopy support bar |
| 4. | canopy top edge |
| 5. | canopy bottom edge |
| 6. | securing tab |
| 7. | bolt |
| 8. | frame structure tab |
| 9. | nut |
| 10. | fastening means |
| 11. | canopy holder |
| 12. | hole |
| 13. | canopy flap |
| 14. | rod |
| 15. | canopy fastener |
| 16. | canopy side |
| 17. | golf cart support bar |
| 18. | golf bag support bar |
| 19. | storage area |
| 20. | golf cart seat |

-continued

| | |
|---|---|
| 21. | legs |
| 22. | bracket |
| 23. | horizontal top bar |
| 24. | leg extension |
| 25. | roof extension |
| 26. | base end |

With reference to FIG. 1, a frontal view of the vertically attached golf cart canopy of the present invention is shown. The vertically attached golf cart canopy has a securing frame 1, canopy support bars 2 and 3 and a canopy with a top edge 4, a rear edge 5 and two sides 16. The securing frame 1 has a canopy holder 11, a horizontal top bar 23 and two legs 21 which extend downward. Each leg 21 turns inward at a substantially ninety degree angle so as to form a leg extension 24. Located on each leg extension 24 is at least one securing tab 6 for the securement of the vertically attached golf cart canopy to a golf cart. A bolt head 7 indicates the pivoting point of the middle support bar 2 and bottom support bar 3. An optional bracket 22 may be located on the securing frame 1 so as aid in maintaining the vertically attached golf cart canopy in an upright position. A canopy top edge 4 covers the space between the securing frame 1 and the middle canopy support bar 2 while a canopy rear edge 5 covers the space between the middle canopy support bar 2 and the bottom canopy support bar 3. Preferably, only the canopy rear edge 5 is transparent so as to allow the user to have rear view through the back of the golf cart. The canopy top edge 4 is preferably opaque so as prevent the golf clubs from being exposed to sun's rays. Although the present invention is shown with only one middle canopy support bar 2, the present invention could be utilized with a plurality of middle canopy support bars added thereto. It is to be understood that the canopy top edge 4 will cover the exposed portions located between the securing frame 1 and the middle canopy support bars while the canopy rear edge 5 will cover the exposed portions located between the bottom canopy support bar 3 and the nearest middle canopy support bar.

Figure 2:
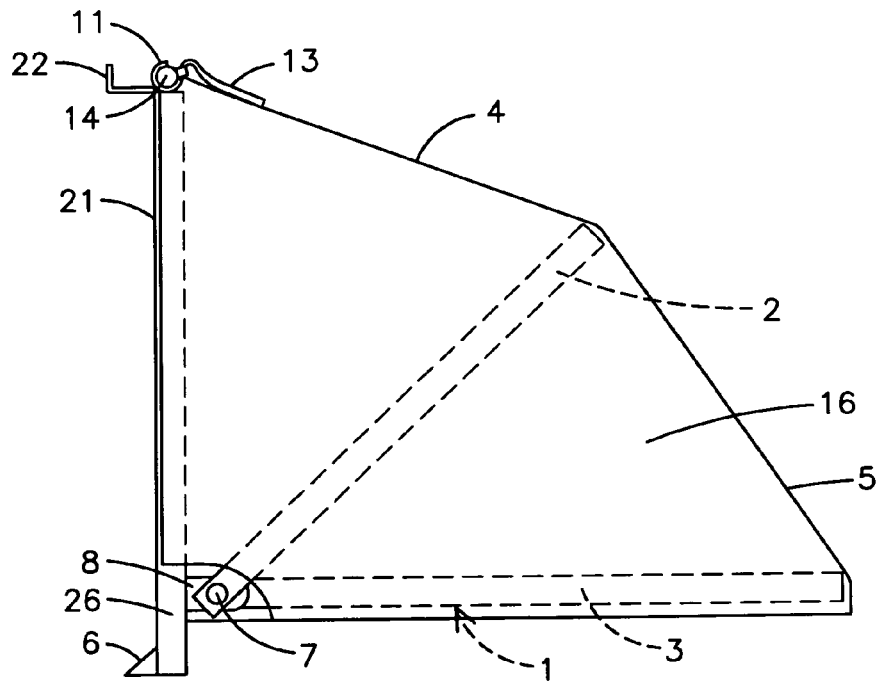
FIG. 2 is a side view of the embodiment of FIG. 1.

With reference to FIG. 2, a side view of the embodiment of FIG. 1 is shown. The canopy holder 11 is C-shaped and holds the rod 14. The rod 14, in turn, has attached to it the canopy flap 13, the canopy sides 16, the canopy top edge 4 and the canopy rear edge 5. The side canopy 16 covers the lateral spaces between the legs of the securing frame 21, the middle canopy support bar 2 and the bottom canopy support bar 3 without covering the bolt head 7. The bolt head 7 indicates the area where the frame structure tab 8 located on the base end 26 of the legs of the securing frame 21, the middle canopy support bar 2 and the bottom canopy support bar 3 are pivotally attached to one another.

Figure 3:
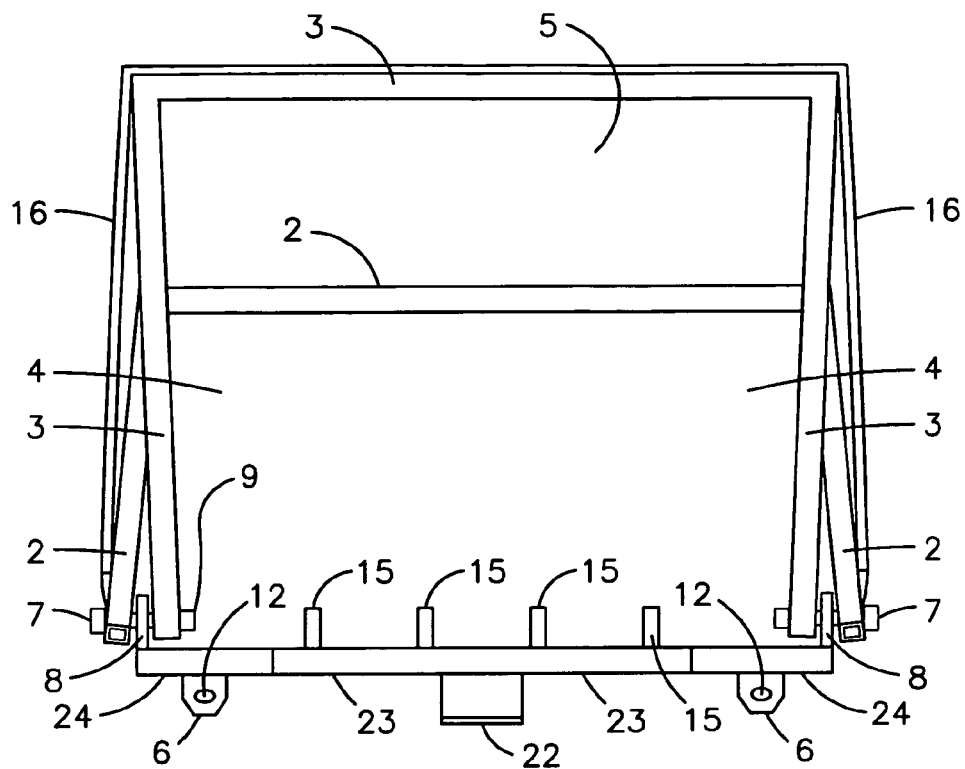
FIG. 3 is upwardly-looking view of the embodiment of FIG. 1.

In FIG. 3, an upwardly-looking view of the embodiment of FIG. 1 is shown. Each leg extension 24 has at least one securing tab 6 having a centrally located hole 12 allows for the securing of the present invention to the golf bag support bar 18 located on golf carts by utilizing a securing means. The preferably securing is by inserting a bolt 7 into the hole 12, which is preferably sized for the accommodation of a bolt 7, and securing the bolt 7 in the golf bag support bar 18. Canopy fasteners 15 are attached to the rod 14, which wherein the rod 14 is then inserted into the canopy holder 11 on the securing frame 1. Frame structure tabs 8 are located on both legs 21, preferably at a predetermined distance above the leg extensions 24. To pivotally attach the canopy support bars 2 and 3 to the securing frame 1, a nut 9 and bolt 7 are used. From the inner portion of the vertically attachable golf cart canopy extending outward, the bottom canopy support bar 3, the frame structure tab 8 and the middle canopy support bar 2 are joined together by the nut 9 and bolt 7 to give the device its pivotal nature.

Figure 4:
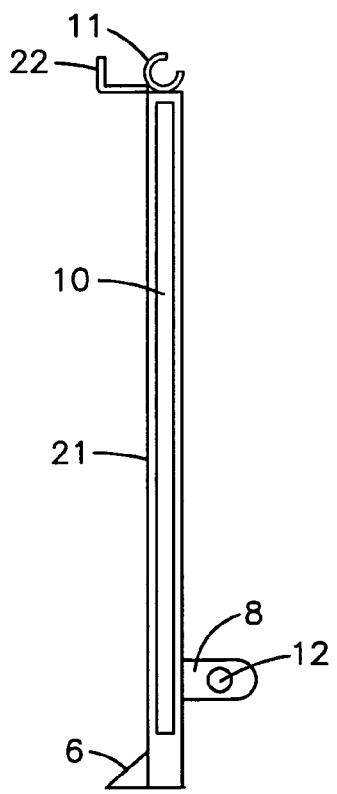
FIG. 4 is a side view of the leg of the securing frame of the present invention without a canopy.

In FIG. 4, the leg of the securing frame of the present invention without a canopy or canopy support bars is shown. The leg 21 has a fastening means 10, preferably hook and loop type fastening material, attached thereto along its side and a C-shaped canopy holder 11 located at the top of the leg 21. The leg 21 also has frame structure tab 8 located at the bottom and extending away from the leg 21. The extension legs 24 each have at least one securing tab 6. The hole 12 in the frame structure tab 8 indicates where a nut 9 and bolt 7 would be used to act as the pivoting point of the device. The pivoting point is located at a predetermined distance above the securing tabs 6 so as to yield more room for storage underneath the device as compared to current golf club cart canopies.

Figure 5:
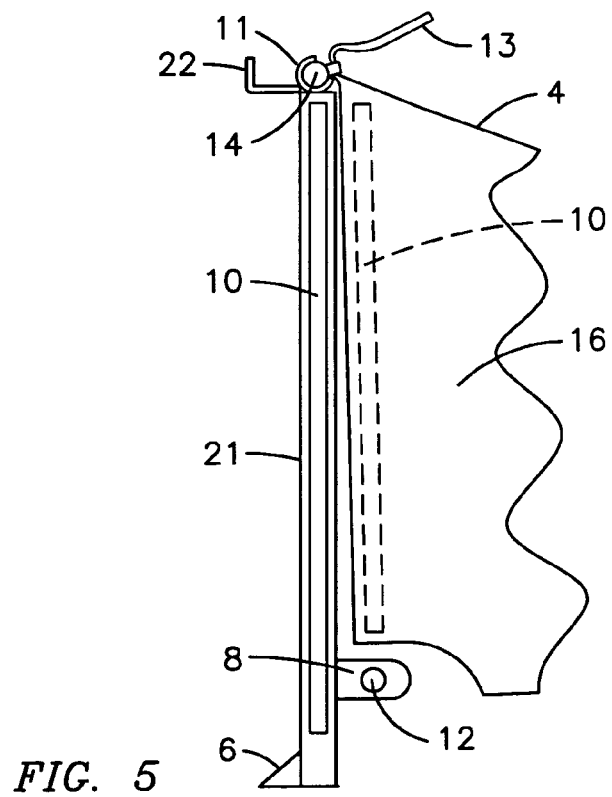
FIG. 5 is a side view of the embodiment of FIG. 4 with a canopy.

With reference to FIG. 5, a side view of the embodiment of FIG. 4 with a canopy is shown. The canopy holder 11 accommodates a rod 14 wherein attached is a canopy flap 13, the canopy sides 16, the top canopy 4 and rear canopy 5. Along the inside of the canopy side 16 is a fastening means 10 to affix the canopy side 16 to corresponding fastening means 10 located on the leg 21 of the securing frame 1. Preferably, the securing means are hook and loop type fastening material.

In FIG. 6, a cut-away view along the lines 6-6 of the embodiment of FIG. 1 is shown. Canopy fasteners 15 extend from the canopy holder 11 and have a fastening means, preferably snaps, located thereupon. A nut 9 and bolt 7 keeps the frame structure tab 8, middle support bar 2 and bottom support bar 3 together in a pivotal nature.

With reference to FIG. 7, a side view of the present invention when upright is shown. The middle canopy support bar 2 and bottom canopy support bar 3 are vertical when the canopy flap 13 is placed around the bars 2 and 3. The canopy fasteners 15 are then placed around the canopy support bars 2 and 3 and secured to the canopy flap 13 by using the fastening means, preferably snaps.

In FIG. 8, a side view of the canopy holder of the present invention is shown. The canopy holder 11 is C-shaped and is sized to accommodate a rod 14. The rod 14 has attached to it a canopy flap 13, canopy fasteners 15 and the top canopy 4, rear canopy 5 and side canopy 16, although only the side canopy 16 is shown.

Figure 9:
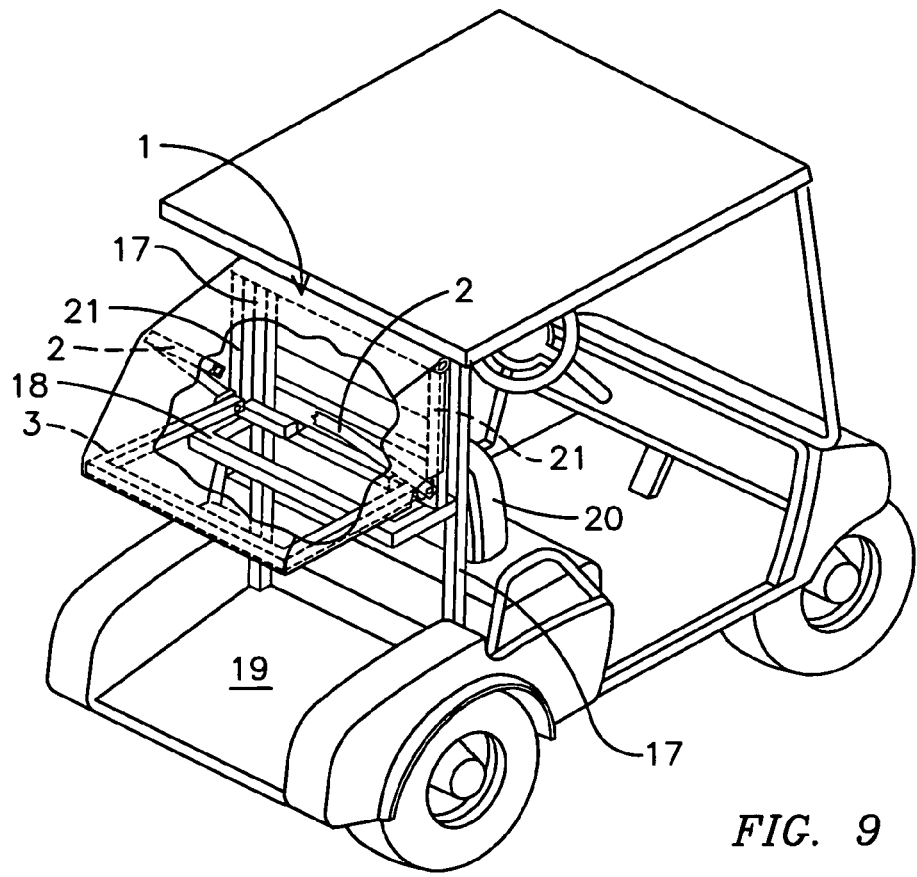
FIG. 9 is a perspective view of the present invention secured to a golf cart.

In FIG. 9, a perspective view of the present invention secured to a golf cart is shown. The golf cart has two golf cart support bars 17, a golf bag support bar 18 and a storage area 19. The vertically attached golf cart canopy is designed so as the legs 21 of the securing frame 1 are a predetermined distance away from the golf cart support bars 17 when the securing tabs 6 are secured to the golf support bar 18. Thus, there is no need to secure the vertically attached golf cart canopy to the roof of the golf cart or, in fact, make any alterations to the golf cart.

Figure 10:
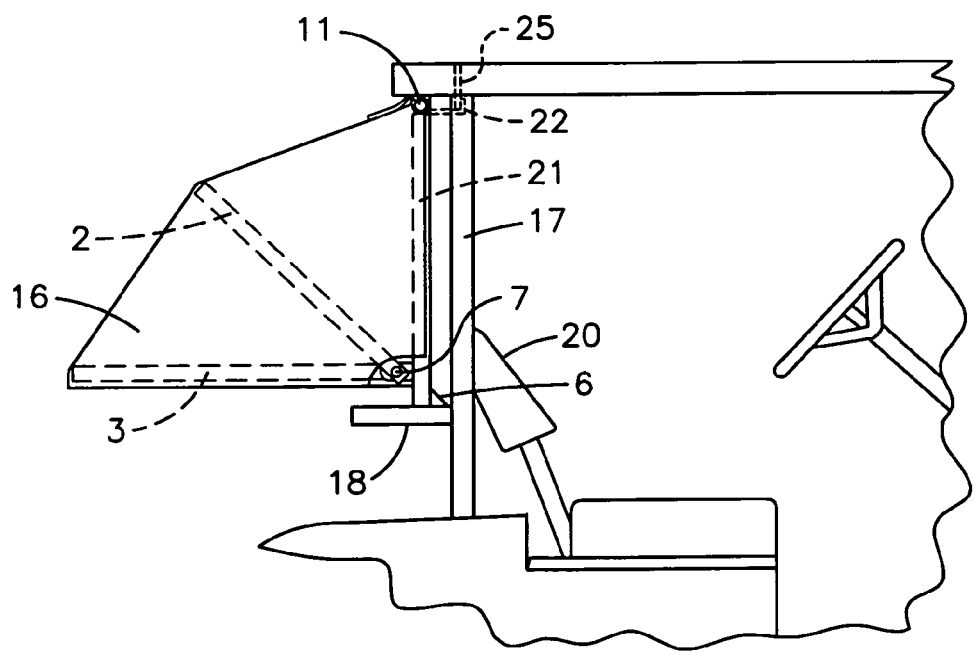
FIG. 10 is a side view of the present invention secured to a golf cart.

Finally, with reference to FIG. 10, a side view of the present invention secured to a golf cart is shown. When the present invention is installed on a golf cart, the canopy holder 11 is located under the golf cart roof and legs 21 are a predetermined distance away from the golf cart support bars 17, thus, making it difficult for rainwater to enter the storage area 19. The securing tabs 6 secure to the golf bag support bar 18 by using bolts 7. The optional bracket 22, which is preferably L-shaped and extends away from the securing frame 1, may also be used to assist in maintaining the vertically attached golf cart canopy in an upright position by positioning a roof extension 25 which hangs from the golf cart roof between the securing frame 1 and the bracket.

The use of the present invention will allow users to mount other accessories, such as coolers and sand bottles, beneath a canopy cover which acts as a protective cover from wind, rain, sun and other elements of nature.

It is to be understood that while a certain form of the invention is illustrated, it is not to be limited to the specific form or arrangement of parts herein described and shown. It will be apparent to those skilled in the art that various changes may be made without departing from the scope of the invention and the invention is not be considered limited to what is shown and described in the specification and drawings.

Having thus described my invention, I claim:

1. A vertically attachable golf cart canopy comprising:
   a rigid securing frame of a predetermined shape having two vertical legs and a horizontal top bar rigidly connected to each leg;
   each leg having an inner side facing each other and an outer side;
   each leg having a leg extension attached to said leg inner side and extending toward each other;
   each leg of the securing frame having a frame structure tab located thereon;
   each leg extension having a means for attaching each leg extension to a golf cart bag support bar;
   at least one canopy support bar pivotally attached to the securing frame;
   the at least one canopy support bar is pivotally attached to the frame structure tabs;
   each frame structure tab being located on each leg of the securing frame at a predetermined distance above each leg extension, thereby adding additional clearance between the canopy support bar and the golf cart bag support bar when the canopy is extended and in use;
   a canopy having a top edge, a rear edge and two sides over the at least one canopy support bar; and
   a means for attaching the canopy to the securing frame.

2. The vertically attachable golf cart canopy of claim 1 further comprising:
   a bracket secured to said horizontal top bar.

3. The vertically attachable golf cart canopy of claim 1 wherein:
   the leg extensions are located above the golf cart bag support bar when affixed to the golf bag support bar.

4. The vertically attachable golf cart canopy of claim 1 wherein:
   the means for attaching the leg extensions to the golf bag support bar is by using at least one securing tab;
   the at least one securing tab is fixedly attached to the leg extensions;
   the at least one securing tab has at least one hole located thereupon; and
   the at least one securing tab hole is sized to accommodate a bolt.

5. The vertically attachable golf cart canopy of claim 1 wherein:
   the securing frame has a canopy holder fixedly attached along the top horizontal bar;
   the canopy holder is C-shaped;
   a rod attached to the canopy holder; and
   the canopy holder is sized to accommodate the rod.

6. The vertically attachable golf cart canopy of claim 5 wherein:
   the rod attached to the canopy holder is removable;
   the rod has a canopy flap attached thereon having a size sufficient to wrap around the canopy when upright;
   the rod has a canopy attached thereon; and
   the rod has at least one canopy fastener attached thereon.

7. The vertically attachable golf cart canopy of claim 6 wherein:
the canopy flap has an end; and
the end of the canopy flap has a fastening means located thereon.

8. The vertically attachable golf cart canopy of claim 7 wherein:
the fastening means located on the end of the canopy flap is snaps.

9. The vertically attachable golf cart canopy of claim 6 wherein:
the at least one canopy fastener is a strip of fabric;
the strip of fabric has an end; and
the end of the strip of fabric has a snap attached thereon.

10. The vertically attachable golf cart canopy of claim 3 further comprising:
said means for attaching each leg extension to a golf cart bag support bar is at least one securement tab.

11. The vertically attachable golf cart canopy of claim 1 wherein:
two canopy support bars are pivotally attached to the securing frame.

12. The golf vertically attachable golf cart canopy of claim 1 wherein:
the means for attaching the canopy to the securing frame is hook and loop type fastening material.

13. The vertically attachable golf cart canopy of claim 12 further comprising:
a means for attaching the canopy to the at least one canopy support bar.

14. The vertically attachable golf cart canopy of claim 13 wherein:
the means for attaching is hook and loop type fastening material.

15. The vertically attachable golf cart canopy of claim 1 wherein:
the canopy has at least one edge which is transparent.

16. The vertically attachable golf cart canopy of claim 1 wherein:
the canopy has at least one side which is transparent.

17. The vertically attached golf cart canopy of claim 2 wherein:
said bracket is L-shaped and extends away from said rigid securing frame.

18. The vertically attached golf cart canopy of claim 10 wherein:
said at least one securement tab has at least one hole.

19. The vertically attached golf cart canopy of claim 18 wherein:
said at least one hole is sized for acceptance of a bolt.

20. A vertically attachable golf cart canopy comprising:
a rigid securing frame of a predetermined shape having two vertical legs and a horizontal top bar rigidly connected to each leg;
each leg having an inner side facing each other and an outer side;
each leg having a leg extension attached to said leg inner side and extending toward each other;
each leg extension extending only a predetermined distance away from the each leg inner side, thereby creating a space between the leg extensions;
each leg of the securing frame having a frame structure tab located thereon;
each leg extension having a means for attaching each leg extension to a golf cart bag support bar;
at least one canopy support bar pivotally attached to the securing frame;
the at least one canopy support bar is pivotally attached to the frame structure tabs;
each frame structure tab being located on each leg of the securing frame at a predetermined distance above each leg extension, thereby adding additional clearance between the canopy support bar and the golf cart bag support bar when the canopy is extended and in use;
a canopy having a top edge, a rear edge and two sides over the at least one canopy support bar; and
a means for attaching the canopy to the securing frame.

* * * * *